Figure 1:
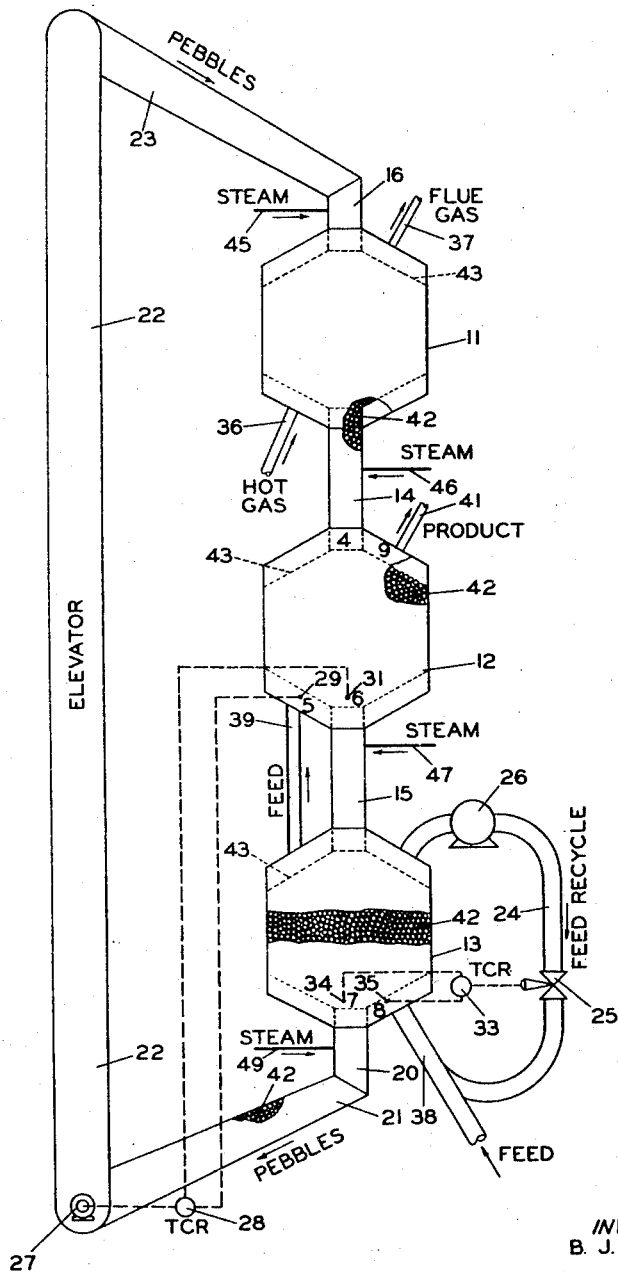

Dec. 16, 1947.    B. J. FERRO, JR    2,432,872
PEBBLE HEATER
Filed March 24, 1947    2 Sheets-Sheet 2

INVENTOR
B. J. FERRO, JR.
BY Hudson & Young
ATTORNEYS

Patented Dec. 16, 1947

2,432,872

UNITED STATES PATENT OFFICE 2,432,872

PEBBLE HEATER

Bernardo J. Ferro, Jr., Bartlesville, Okla., assignor to Phillips Petroleum Company, a corporation of Delaware Application March 24, 1947, Serial No. 736,873

16 Claims. (Cl. 196—55)

This invention pertains to an improved process and apparatus for heating gases by contact with a descending stream of hot pebbles. A specific aspect of the invention relates to a process and apparatus for high temperature conversion of hydrocarbons.

Pebble heater operation with which this invention is concerned is being utilized in a variety of chemical processes and treatments in which extremely rapid heating of the gases being treated is required. Its application includes conversion of hydrocarbons at high temperature such as cracking and dehydrogenation, the synthesis of HCN from $NH_3$ and CO, the synthesis of $CS_2$ by reacting hydrocarbon vapors with sulphur containing gases, etc. Conventional pebble heater technique entails circulating a continuous mass of pebbles by gravity through a series of chambers or zones in which the pebbles are heated in the upper chamber, transfer heat to the gases being treated in the lower chamber, are elevated to a point above the upper chamber, and are again allowed to descend by gravity through the several chambers. In a typical hydrocarbon conversion process, pebbles are heated in an upper chamber by contact with a counter-current stream of hot flue gas after which they pass into a conversion chamber where they heat the hydrocarbons being processed and supply the heat of reaction required. In many installations a third chamber is positioned below the conversion chamber to effect the preheating of the feed stock and to cool the pebbles sufficiently that they may be handled in ordinary carbon steel elevator equipment. In some processes, instead of preheating the feed in the third chamber, air or fuel for combustion purposes in connection with the pebble heating chamber is circulated through the lower chamber to be preheated and to cool the pebbles therein. It is in pebble heater operation involving a gas preheating step in a third chamber with which this invention is concerned.

In processes in which the fluid stream being treated undergoes a physical or chemical reaction accompanied by an appreciable change of specific heat some difficulty is encountered in regulating and controlling the temperature differential between the pebble and fluid streams. The same difficulty is encountered when there is a large difference between the specific heats of the fluid and pebble streams. In endothermic reactions, e. g., the differential between inlet pebble temperature and outlet gas temperature in the reaction chamber must be relatively high in order to transfer sufficient heat to the reaction chamber to effect the process desired. It is also desirable that there be substantial difference between outlet pebble temperature and inlet gas temperature. This means that the pebbles entering the preheating chamber are at a relatively high temperature and since the volume of gas being preheated is the same as that being reacted, the heat exchanged between the pebble stream and the fluid stream in the preheating chamber does not lower pebble temperature to the proximity of inlet gas temperature. This results in a relatively high differential between gas inlet temperature and pebble outlet temperature in the preheating chamber. Such high differential between pebble and fluid temperatures results in large superficial thermal stresses and subsequent breaking of pebbles. It also results in less efficient utilization of heat in pebble heater operations. It is with these difficulties that the present invention is concerned.

It is an object of the present invention to provide a means for regulating and controlling the temperature approach or difference between the pebble and fluid streams in a pebble heater where the latter stream undergoes a physical or chemical reaction accompanied by an appreciable change of specific heat or where there are large differences between the specific heats of the fluid and pebble streams. It is also an object of the invention to reduce or eliminate pebble breakage in pebble heater operations. A further object of the invention is to provide for more efficient operation of a pebble heater by permitting closer correlation between pebble and fluid stream temperature. It is also an object of the invention to prevent temperature lock of the two streams and at the same time prevent extremely large temperature differences either at the top or bottom of the heater.

The term pebble as referred to throughout the specifications is defined as any particulate refractory contact material which is readily flowable through a contact chamber. Pebbles are preferably spherical in form and range from about ⅛" to 1" in size, but spheres ranging in size from about ¼" to ½" are the most practical. Uniform shapes and sizes are preferred but pebbles of irregular shape and size may be used. Pebbles may be made of ceramic material such as alumina or of metals and alloys such as iron, nickel, Monel and inconel.

While the invention has its greatest applicability in the conversion of hydrocarbons, it is not so limited but is applicable to any pebble heater process enhanced by careful control of pebble and fluid temperature differential. The invention provides for maintaining a predetermined temperature differential in the reaction zone between the incoming feed gas and the outgoing pebbles by controlling the rate of flow of pebbles through the system in response to variations from the predetermined temperature differential. My invention also provides for maintaining a relatively low predetermined temperature differential in the preheating chamber between the incoming feed and the outgoing pebbles by recycling a substantial amount of the preheated feed from the upper portion of the preheating chamber to the feed inlet and controlling the amount of recycling in response to variations from the predetermined temperature differential. By recycling a substantial portion of the preheated feed gas and mixing it with the cold feed coming into the preheating chamber a considerably higher fluid temperature in the lower portion of the preheating chamber is obtained. This amounts to preheating the feed to the preheating chamber, but it effects a lower temperature differential between the fluid and pebble streams in the lower portion of the preheating chamber whereas preheating the feed to the preheating chamber from another heat source than the pebbles themselves would not result in a lower temperature differential.

Figure 3:
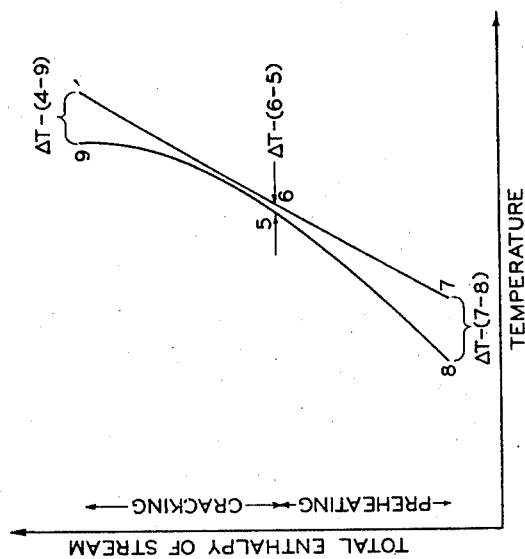
Figure 2:
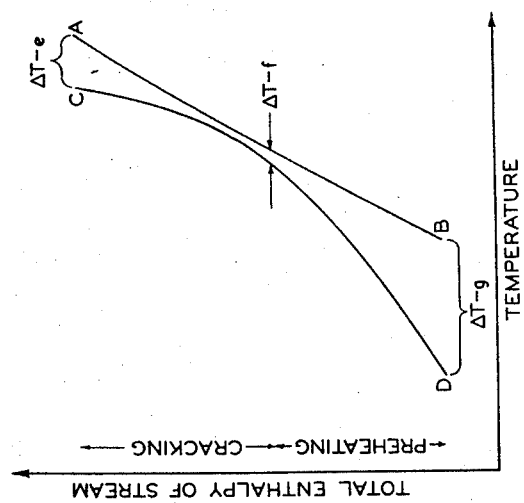

In order to facilitate understanding of the invention, reference is made to the drawing of which Figure 1 is an elevational view partly in section of a preferred arrangement of apparatus according to the invention. Figure 2 is a graphic representation of the relation between the temperature and total enthalpy of a pebble and fluid stream in a typical pebble heater hydrocarbon cracking process without recycling of the preheated hydrocarbon feed. Figure 3 is a graphic representation of the temperature-enthalpy relation of the same two streams but with a recycle of a substantial portion of the preheated feed.

Referring to Figure 1, numerals 11, 12 and 13 designate a pebble heating chamber, a gas treating or conversion chamber and a gas preheating chamber, respectively, connected by throats 14 and 15, and vertically arranged for gravity flow of pebbles therethrough. Pebbles 42 are admitted to pebble heating chamber 11 through conduit 16, and while passing through the heater the pebble stream is contacted with hot combustion gas fed into the chamber through line 36 and egressing through line 37. Alternatively, fuel gas and air may be admitted to the lower portion of the pebble heating chamber 11 and burned therein to supply the combustion gas and heat for the descending stream of pebbles. The hot pebble stream entering conversion chamber 12 is contacted by preheated gas entering this chamber through line 39 and supplies the heat requirements of the process in this chamber. Effluent products from chamber 12 are taken off through line 41 which leads to treating apparatus not shown. The partially cooled pebble stream passes into preheating chamber 13 through throat 15 and is therein contacted in counter current flow with a stream of feed gas admitted through line 38 and taken off through line 39 which leads into chamber 12 and through recycle line 24 which connects with the incoming feed line 38. The relatively cool pebble stream is taken off through line 20 into chute 21 which leads to elevator 22. Elevator 22 lifts the pebbles to a point above heating chamber 11 and drops them into chute 23, from which they are delivered into pebble inlet 16 and again flow into the heating chamber.

The flow rate of the recycled stream in line 24 is controlled by valve 25, which is operated by temperature-controller-recorder 33 in response to variations from a predetermined temperature differential between points 7 and 8 where thermocouples 34 and 35 are located. Compressor 26 maintains flow through the line 24. Inlet 16 and pebble throats 14 and 15 are extended into their respective chambers a short distance in order to provide a vapor space above each pebble bed and thereby minimize undesirable channeling of gases. Due to the natural angle of repose of the pebbles each pebble bed has a conical top surface 43. Pebble throats and chambers are insulated and refractory lined and the latter are advantageously constructed with conical bottoms which serve as hoppers to feed the pebbles out of their respective chambers.

One of the important features of the invention is the step of recycling a substantial portion of the preheated feed from the upper portion of the preheating chamber through line 24 to feed line 38 and the mixing of the preheated feed with the cool feed stream in line 38 to raise the temperature of the influent gas and thereby maintain a relatively low temperature differential between influent gas and the pebble stream egressing through line 20. Temperature-controller-recorder 33 is designed to maintain a predetermined temperature differential between points 7 and 8 by regulating valve 25 and thereby controlling the flow of preheated gas through line 24. Temperature-controller-recorder 33 is in communication with thermocouples 34 and 35 positioned at points 7 and 8 respectively, and automatically controls the recycle through valve 25.

Another important feature of my invention is the careful control of temperature differential between the fluid and pebble streams in the lower portion of reaction chamber 12. The rate of flow of the main pebble stream through chamber 12 and through the entire system is regulated by variable speed motor 27 which operates elevator 22 in response to temperature-controller-recorder 28. Temperature-controller-recorder 28 varies the speed of motor 27 in response to variations from a predetermined temperature differential between the fluid stream at point 5 and the pebble stream at point 6 through communication with thermocouples 29 and 31, respectively. For a given heating and/or conversion process with a constant fluid flow rate through chamber 12 and with a sufficiently high pebble inlet temperature to chamber 12, a desirable temperature differential between points 5 and 6 is established. The controls are then set to maintain this predetermined temperature differential by varying the flow of pebbles through the system through control of motor 27.

It can readily be seen that the controls described are designed to maintain temperature differentials between fluid and pebble streams in both the fluid treating zone and the fluid preheating zone consistent with pebble economy. While temperature differentials will vary according to the process being performed, differentials of the order of 50 to about 500 degrees F. cover a practical range of operations.

Other arrangements of the apparatus shown are feasible. Some installations utilize a single long chamber having a pebble heating zone in the upper end, a feed preheating zone in the lower end, and a conversion zone intermediate thereof. In such a system intermixing of gases is prevented to a large extent by proper control of the pressure. The temperature control system of the invention is also applicable to this type of pebble heater installation.

Certain modifications of the temperature control system are feasible. For example, temperature-controller-recorder 28 may be connected to a valve in throat 14 or throat 15 or in outlet 20, thereby regulating the flow of pebbles through the system. However, it is far more feasible to control pebble flow by a variable speed conveyer driver.

The system shown in Figure 1 operates most advantageously at gas pressures of about 0.5 to about 6 p. s. i. g., but other pressures above and below atmospheric may be utilized. In order to prevent escape of gases from various chambers, feed lines 45, 46, 47 and 49 may be utilized to form a steam block in the zones to which they lead. Other non-deleterious gases may be introduced through these lines to prevent mixture of feed and combustion gases.

The graphs of Figures 2 and 3 clearly illustrate the advantage of temperature control obtained by operating according to the invention. Temperature-enthalpy lines are shown for both hydrocarbon and pebble streams in a typical hydrocarbon cracking operation. Figure 2 represents operations in which there is no recycling of gas in the preheating chamber, while Figure 3 represents operations where a suitable temperature differential is obtained by recycling a substantial portion of the gas from the upper portion of the preheating chamber to the lower portion thereof. In Figure 2 the temperature-enthalpy line of the pebble stream is shown as AB and that of the hydrocarbon as CD. An initial temperature difference $\Delta T-e$ is selected so that a desirable $\Delta T-f$ is obtained at the beginning of the cracking reaction. It is apparent that this results in a larger $\Delta T-g$ than is required for efficient preheating of the feed and produces undue thermal stress on the exterior surface of the pebbles.

In Figure 3 line 9—5—8 represents the temperature-enthalpy relation of the fluid stream as it passes from point 8 to point 5 to point 9 in the system shown in Figure 1. Line 4—6—7 represents the temperature-enthalpy relation of the pebble stream in its passage from point 4 through point 6 to point 7 in Figure 1. $\Delta T(4-9)$ is the same as $\Delta T-e$ and $\Delta T(6-5)$ is the same as $\Delta T-f$, but it can readily be seen that $\Delta T(7-8)$ is considerably smaller than $\Delta T-g$. In other words utilizing the same differential between pebble inlet temperature and product outlet temperature from the reaction zone and the same temperature differential between inlet feed gas and outlet pebble temperature in the reaction zone, the invention makes it possible to operate with a much lower temperature differential between the pebble and fluid streams in the lower portion of the preheating chamber. Obviously this advantage is effected by recycling a substantial portion of the preheated feed gas and mixing it with the influent feed to the preheating chamber, thereby raising the temperature of the mixture and reducing the differential between fluid and pebble streams. This feature of my invention permits better utilization of heat and less pebble breakage than is obtained in conventional operation.

In a typical utilization of my invention a feed stock having the following composition by weight percent:

| | |
|---|---|
| Methane | 2.6 |
| Ethane | 21.6 |
| Propane | 74.5 |
| Butanes and heavier | 1.3 | is processed in apparatus arranged according to Figure 1 to produce an olefin-rich gas of the following composition by weight percent:

| | |
|---|---|
| Hydrogen | 2.1 |
| Methane | 21.0 |
| Ethylene | 36.5 |
| Ethane | 13.4 |
| Propylene | 9.4 |
| Propane | 7.7 |
| Butanes and heavier | 9.9 | under the following temperature conditions:

| | °F. |
|---|---|
| Initial feed | 100 |
| Feed at 8 (Figure 1) | 400 |
| Feed preheat at 5 | 1,200 |
| Product at 9 | 1,700 |
| Gas in line 36 | 3,000 |
| Flue gas, line 37 | 700 |
| Pebbles at 4 | 1,900 |
| Pebbles at 6 | 1,400 |
| Pebbles at 7 | 500 |

A relatively constant feed rate of approximately 68,620 cubic feet per hour is maintained with a production of 122,917 cubic feet of product gas using ⅜" dense high purity alumina pebbles. The amount of recycle is automatically controlled to raise the initial feed temperature from 100° F. to about 400° F. Pebble flow through the system is regulated automatically by control 28 to maintain a relatively uniform temperature differential of 200° F. between the fluid stream and the pebble stream in the lower portion of the reaction zone. The amount of pebble deterioration and breakage due to thermal stress is considerably reduced over pebble breakage and deterioration resulting from ordinary operation. It is apparent from a consideration of the above example that my invention results in more efficient utilization of heat than is obtained in conventional pebble heater operations with less thermal shock and physical strain on the pebbles. Operation according to the invention is not limited to the specific temperatures recited in the example. Conversion temperatures may be varied from about 1300° to about 3000° F., with correspondingly varied pebble temperatures. Temperature differentials between the gases being processed and pebbles may likewise be varied to suit the particular type of process involved. When highly endothermic reactions are being conducted in the conversion chamber temperature differential therein between pebbles entering and product leaving the chamber is desirably higher and may be of the order of about 300° to about 800° F. In processes requiring slower rates of heat transfer, temperature differentials may be as low as about 50° F.

Various modifications of the invention will become apparent to those skilled in the art. The illustrative details disclosed are not to be construed as imposing unnecessary limitations on the invention.

I claim:

1. A continuous process for effecting thermal reactions at elevated temperatures in the vapor phase which comprises continuously flowing by gravity a contiguous fluent mass of hot refractory pebbles through a series of substantially vertically extending zones comprising from highest to lowest a pebble heating zone, a reaction zone, and a feed preheating zone, and several relatively narrow connecting zones for permitting free flow of pebbles between said first-named zones, all of said zones being susbtantially filled with said pebbles; continuously contacting that portion of said mass of pebbles in said pebble heating zone with a stream of hot combustion gas, thereby heating said pebbles to a temperature substantially above a predetermined reaction temperature; continuously contacting that portion of said mass of pebbles in said preheating zone with a stream of feed gas to be reacted, thereby preheating said gas a substantial amount; continuously passing a substantial portion of the thus preheated feed gas into said reaction zone and there contacting that portion of said mass of pebbles in said zone with said preheated feed gas, thereby heating and reacting said feed gas a controlled amount; continuously withdrawing a separate substantial portion of the thus preheated feed from the upper portion of said preheating zone and continuously introducing the same to the lower portion of said preheating zone; continuously transferring pebbles from the lower portion of said preheating zone to the upper portion of said pebble heating zone at a rate controlled to maintain a predetermined temperature differential between the inlet gas temperature and outlet pebble temperature in the reaction zone, thereby maintaining a predetermined reaction temperature.

2. A continuous process for effecting conversion of hydrocarbons in the vapor phase which comprises continuously flowing by gravity a contiguous fluent mass of hot refractory pebbles through a series of substantially vertically extending zones comprising from highest to lowest a pebble heating zone, a conversion zone, and a hydrocarbon preheating zone, and several relatively narrow connecting zones for effecting relatively free flow of pebbles between said first-named zones, all of said zones being substantially filled with said pebbles; continuously contacting that portion of said mass of pebbles in said pebble heating zone with a stream of hot combustion gas thereby heating said pebbles to a temperature substantially above a predetermined conversion temperature; continuously contacting that portion of said mass of pebbles in said preheating zone with a hydrocarbon vapor stream to be converted, thereby preheating said hydrocarbon stream a substantial amount; continuously passing a substantial portion of the thus preheated hydrocarbon stream into said conversion zone and there counter-currently contacting that portion of said mass of pebbles in said zone with said preheated hydrocarbon stream thereby effecting desirable conversion of said hydrocarbons; continuously withdrawing a separate substantial portion of said preheated hydrocarbon stream from the upper portion of said preheating zone and continuously introducing the same to the lower portion of said preheating zone; continuously transferring pebbles from the lower portion of said preheating zone to the upper portion of said pebble heating zone at a rate regulated to maintain a predetermined temperature differential between inlet vapor temperature and outlet pebble temperature in the conversion zone thereby maintaining a predetermined conversion temperature.

3. A continuous process for effecting thermal treatment of gases at elevated temperatures which comprises continuously flowing by gravity a fluent mass of hot refractory pebbles through a series of substantially vertically extending zones comprising from highest to lowest a pebble heating zone, a gas treating zone, and a gas preheating zone; continuously contacting that portion of said mass of pebbles in said pebble heating zone with a stream of hot combustion gas, thereby substantially heating said pebbles; continuously contacting that portion of said mass of pebbles in said preheating zone with a countercurrent stream of the gas to be treated, thereby preheating said gas a substantial amount; continuously withdrawing a substantial portion of the thus preheated gas and reintroducing the same along with relatively cool feed gas to the lower portion of said preheating zone thereby maintaining a relatively low temperature differential between incoming feed gas and outgoing pebbles; continuously contacting that portion of said mass of pebbles in said treating zone with a countercurrent stream of the thus preheated gas, thereby effecting the desired treatment of said gas; continuously transferring pebbles from the lower portion of said preheating zone to the upper portion of said pebble heating zone at a rate regulated to maintain a predetermined temperature differential between inlet gas temperature and outlet pebble temperature in the gas treating zone, thereby maintaining a predetermined gas treating temperature; and continuously recovering effluents from the gas treating zone.

4. An continuous process for cracking hydrocarbons at elevated temperatures in gas or vapor phase which comprises continuously flowing by gravity a contiguous fluent mass of hot refractory pebbles through a series of substantially vertically extending zones comprising from highest to lowest a pebble heating zone, a cracking zone, and a hydrocarbon preheating zone each substantially filled with said pebbles; continuously contacting that portion of said mass of pebbles in said pebble heating zone with a stream of hot combustion gas, thereby heating said pebbles to a temperature substantially above a predetermined cracking temperature; continuously contacting that portion of said mass of pebbles in said preheating zone with a relatively cool stream of hydrocarbon gas to be cracked, thereby preheating said stream a substantial amount; continuously withdrawing a substantial portion of the thus preheated hydrocarbon stream from the upper portion of said preheating zone and reintroducing the same along with said cool hydrocarbon stream to the lower portion of said preheating zone thereby maintaining a relatively low temperature differential between incoming hydrocarbon gas and outgoing pebbles; continuously passing a substantial portion of the thus preheated hydrocarbon stream into said cracking zone in contact with that portion of said mass of pebbles therein, thereby heating and cracking said hydrocarbon stream a controlled amount; maintaining said predetermined cracking temperature in said cracking zone by continuously withdrawing pebbles from the lower portion of said preheating zone at a rate responsive to variations in temperature differential between inlet gas temperature and outlet pebble temperature in said cracking zone; and continuously recovering effluents from said cracking zone.

5. A continuous process for cracking hydrocarbons at elevated temperatures in gas or vapor phase which comprises continuously flowing by gravity a contiguous fluent mass of hot refractory pebbles through a series of substantially vertically extending zones comprising from highest to lowest a pebble heating zone, a cracking zone, and a hydrocarbon preheating zone each substantially filled with said pebbles; continuously contacting that portion of said mass of pebbles in said pebble heating zone with a stream of hot combustion gas, thereby heating said pebbles to a temperature substantially above a predetermined cracking temperature; continuously contacting that portion of said mass of pebbles in said preheating zone with a stream of relatively cool hydrocarbon gas to be cracked, thereby preheating said stream a substantial amount; continuously passing a portion of the thus preheated hydrocarbon stream into said cracking zone in contact with that portion of said mass of pebbles therein, thereby heating and cracking said hydrocarbon stream a controlled amount; maintaining said predetermined cracking temperature in said cracking zone by continuously withdrawing pebbles from the lower portion of said preheating zone at a rate responsive to variations in temperature differential between inlet gas temperature and outlet pebble temperature in said cracking zone; maintaining a predetermined temperature differential between inlet gas and outlet pebbles in the preheating zone by continuously recycling a substantial portion of said preheated hydrocarbon stream from the upper portion of said preheating zone to the lower portion thereof in admixture with said relatively cool hydrocarbon gas; and continuously recovering effluents from said cracking zone.

6. A continuous process for effecting thermal reactions at elevated temperatures in the vapor phase which comprises continuously flowing by gravity a contiguous fluent mass of hot refractory pebbles through a series of substantially vertically extending zones comprising from highest to lowest a pebble heating zone, a reaction zone, and a feed preheating zone, and several relatively narrow connecting zones for permitting free flow of pebbles between said first-named zones, all of said zones being substantially filled with said pebbles; continuously contacting that portion of said mass of pebbles in said pebble heating zone with a stream of hot combustion gas, thereby heating said pebbles to a temperature substantially above a predetermined reaction temperature; continuously contacting that portion of said mass of pebbles in said preheating zone with a stream of feed gas to be reacted, thereby preheating said gas a substantial amount; continuously passing a substantial portion of the thus preheated feed gas into said reaction zone and there contacting that portion of said mass of pebbles in said zone with said preheated feed gas, thereby heating and reacting said feed gas a desirable amount; continuously withdrawing a separate substantial portion of the thus preheated feed from the upper portion of said preheating zone and continuously introducing the same to the lower portion of said preheating zone; and continuously transferring pebbles from the lower portion of said preheating zone to the upper portion of said pebble heating zone at a rate controlled to maintain a predetermined temperature differential between the inlet gas temperature and outlet pebble temperature in the reaction zone.

7. A continuous process for effecting conversion of hydrocarbons in the vapor phase which comprises continuously flowing by gravity a contiguous fluent mass of hot refractory pebbles through a series of substantially vertically extending zones comprising from highest to lowest a pebble heating zone, a conversion zone, and a hydrocarbon preheating zone, and several relatively narrow connecting zones for effecting relatively free flow of pebbles between said first-named zones, all of said zones being substantially filled with said pebbles; continuously contacting that portion of said mass of pebbles in said pebble heating zone with a stream of hot combustion gas thereby heating said pebbles to a temperature substantially above a predetermined conversion temperature; continuously contacting that portion of said mass of pebbles in said preheating zone with a hydrocarbon vapor stream to be converted, thereby preheating said hydrocarbon stream a substantial amount; continuously passing a substantial portion of the thus preheated hydrocarbon stream into said conversion zone and there contacting that portion of said mass of pebbles in said zone with said preheated hydrocarbon stream thereby effecting desirable conversion of said hydrocarbons; continuously withdrawing a separate substantial portion of said preheated hydrocarbon stream from the upper portion of said preheating zone and continuously introducing the same to the lower portion of said preheating zone; and continuously transferring pebbles from the lower portion of said preheating zone to the upper portion of said pebble heating zone at a rate regulated to maintain desirable conversion temperatures in said conversion zone.

8. A continuous process for effecting thermal treatment of gases at elevated temperatures which comprises continuously flowing by gravity a fluent mass of hot refractory pebbles through a series of substantially vertically extending zones comprising from highest to lowest a pebble heating zone, a gas treating zone, and a gas preheating zone; continuously contacting that portion of said mass of pebbles in said pebble heating zone with a stream of hot combustion gas, thereby substantially heating said pebbles; continuously contacting that portion of said mass of pebbles in said preheating zone with a countercurrent stream of the gas to be treated, thereby preheating said gas a substantial amount; continuously withdrawing a substantial portion of the thus preheated gas and reintroducing the same along with relatively cool feed gas to the lower portion of said preheating zone thereby maintaining a relatively low temperature differential between incoming feed gas and outgoing pebbles; continuously contacting that portion of said mass of pebbles in said treating zone with a countercurrent stream of the thus preheated gas, thereby effecting the desired treatment of said gas; and continuously transferring pebbles from the lower portion of said preheating zone to the upper portion of said pebble heating zone at a rate regulated to maintain desirable thermal conditions in said gas treating zone.

9. In a process for effecting thermal treatment of gases at elevated temperatures comprising continuously flowing by gravity a fluent mass of refractory pebbles through a series of substantially vertically extending zones comprising from highest to lowest a pebble heating zone, a gas treating zone, and a gas preheating zone; contacting that portion of said mass of pebbles in said heating zone with a stream of hot gas to effect a desirable pebble temperature; contacting that portion of said mass of pebbles in said gas preheating zone with a stream of the gas to be treated to effect a desirable gas preheat temperature; contacting that portion of said mass of pebbles in said gas treating zone with a stream of preheated gas from said preheating zone to effect a desired gas treatment; and continuously transferring pebbles from the lower portion of said preheating zone to the upper portion of said pebble heating zone to repeat the cycle; the method of maintaining a low differential between pebble outlet temperature and gas inlet temperature in said preheating zone which comprises continuously withdrawing a substantial amount of the preheated gas from the upper portion of the preheating zone and continuously introducing the same to the lower portion of the preheating zone.

10. The process of claim 9 in which said preheated gas is introduced to said preheating zone in admixture with cooler feed gas.

11. In a process for effecting conversion of hydrocarbons in the vapor phase in which hot recycled pebbles are continuously passed through a conversion zone and a hydrocarbon preheating zone and in which a relatively cool stream of the hydrocarbon vapor is passed through said preheating zone and then through said conversion zone, the method of maintaining a predetermined temperature differential between pebbles and hydrocarbon vapor in the lower portion of said preheating zone which comprises recycling a substantial portion of said vapor from the upper portion of said preheating zone to the lower portion thereof.

12. The process of claim 11 in which the stream of recycled hydrocarbon vapor is mixed with said relatively cool stream of hydrocarbon vapor.

13. In an apparatus for conversion of hydrocarbons in vapor phase at elevated temperatures by contact with a descending stream of hot pebbles, the combination of a heating chamber for heating pebbles by contact with hot combustion gas; supply and discharge means leading to and from said heating chamber for flow of combustion gas thereto and therefrom; a conversion chamber for converting hydrocarbons to desired products disposed at a lower level than said pebble heating chamber; supply and discharge means leading to and from said conversion chamber for flow of gaseous hydrocarbons thereto and conversion products therefrom; a hydrocarbon preheating chamber disposed at a lower level than said conversion chamber; supply and discharge means leading to and from said preheating chamber for flow of cool hydrocarbons thereto and preheated hydrocarbons therefrom, said discharge means being in communication with the supply means to said conversion chamber; conduit means connecting the several aforesaid chambers for flow of pebbles from the highest to the lowest in series; pebble outlet means in the lower portion of said preheating chamber and pebble inlet means in the upper portion of said heating chamber; means for transferring pebbles from said pebble outlet means to said pebble inlet means; means for actuating said pebble transferring means in response to variations from a predetermined temperature differential between selected points in said conversion chamber; means for recycling preheated hydrocarbons from the upper portion of said preheating chamber to said supply means leading thereto; and means for regulating the flow rate of said preheated recycled hydrocarbons in response to variations from a predetermined temperature differential between selected points in said preheating chamber.

14. In an apparatus for conversion of hydrocarbons in vapor phase at elevated temperatures by contact with a descending stream of hot pebbles, the combination of a heating chamber for heating pebbles by contact with hot combustion gas; supply and discharge means leading to and from said heating chamber for flow of combustion gas thereto and therefrom; a conversion chamber for converting hydrocarbons to desired products disposed at a lower level than said pebble heating chamber; supply and discharge means leading to and from said conversion chamber for flow of gaseous hydrocarbons thereto and conversion products therefrom; a hydrocarbon preheating chamber disposed at a lower level than said conversion chamber; supply and discharge means leading to and from said preheating chamber for flow of cool hydrocarbons thereto and preheated hydrocarbons therefrom, said discharge means being in communication with the supply means to said conversion chamber; conduit means connecting the several aforesaid chambers for flow of pebbles from the highest to the lowest in series; pebble outlet means in the lower portion of said preheating chamber and pebble inlet means in the upper portion of said heating chamber; means for transferring pebbles from said pebble outlet means to said pebble inlet means; and means for recyling preheated hydrocarbons from the upper portion of said preheating chamber to said supply means leading thereto.

15. In an apparatus for heating gases or vapors to elevated temperatures by contact with a descending stream of hot pebbles, the combination of a first heating chamber for heating pebbles by contact with hot combustion gas; supply and discharge means leading to and from said heating chamber for flow of combustion gas thereto and therefrom; a second heating chamber for heating said gases or vapors by contact with said descending stream of hot pebbles disposed at a lower level than said first heating chamber; supply and discharge means leading to and from said second heating chamber for flow of said gases or vapors thereto and therefrom; a preheating chamber for preheating said gases or vapors disposed at a lower level than said second heating chamber; supply and discharge means leading to and from said preheating chamber for flow of said gases or vapors thereto and therefrom, said discharge means being in communication with the supply means to said second heating chamber; conduit means connecting the several aforesaid chambers for flow of pebbles from the highest to the lowest in series; pebble outlet means in the lower portion of said preheating chamber; pebble inlet means in the upper portion of said first heating chamber; means for transferring pebbles from said pebble outlet means to said pebble inlet means; and means for recycling preheated gases or vapors from the upper portion of said preheating chamber to the lower portion thereof.

16. In an apparatus for heating gases or vapors to elevated temperatures by contact with a descending stream of hot pebbles, the combination of a first heating chamber for heating pebbles by contact with hot combustion gas; supply and discharge means leading to and from said heating chamber for flow of combustion gas thereto and therefrom; a second heating chamber for heating said gases or vapors by contact with said descending stream of hot pebbles disposed at a lower level than said first heating chamber; supply and discharge means leading to and from said second heating chamber for flow of said gases or vapors thereto and therefrom; a preheating chamber for preheating said gases or vapors disposed at a lower level than said second heating chamber; supply and discharge means leading to and from said preheating chamber for flow of said gases or vapors thereto and therefrom, said discharge means being in communication with the supply means to said second heating chamber; conduit means connecting the several aforesaid chambers for flow of pebbles from the highest to the lowest in series; pebble outlet means in the lower portion of said preheating chamber; pebble inlet means in the upper portion of said first heating chamber; means for transferring pebbles from said pebble outlet means to said pebble inlet means; means for actuating said pebble transferring means in response to variations from a predetermined temperature differential between selected points in said second heating chamber; means for recycling preheated gases or vapors from the upper portion of said preheating chamber to the lower portion thereof; and means for regulating the flow rate of the recycled preheated gases or vapors in response to variations from a predetermined temperature differential between selected points in said preheating chamber.

BERNARDO J. FERRO, Jr.

REFERENCES CITED

The following references are of record in the file of this patent:

UNITED STATES PATENTS

| Number | Name | Date |
|--------|------|------|
| 2,387,378 | Wolk | Oct. 23, 1945 |